United States Patent

[11] 3,628,380

[72] Inventor Charles L. Feldman
 36 Canterbury Drive, Sudbury, Mass. 01776
[21] Appl. No. 823,345
[22] Filed May 9, 1969
[45] Patented Dec. 21, 1971

[54] LOWER VELOCITY WIND TUNNEL
 19 Claims, 3 Drawing Figs.

[52] U.S. Cl. .................................................. 73/147
[51] Int. Cl. ............................................. G01m 9/00
[50] Field of Search ........................................ 73/147

[56] References Cited
UNITED STATES PATENTS

| 3,461,721 | 8/1969 | Jones et al. | 73/147 |
| 2,309,938 | 2/1943 | Diserens | 73/147 X |
| 3,087,332 | 4/1963 | Kern | 73/147 |
| 3,191,435 | 6/1965 | Weller | 73/147 |

*Primary Examiner*—S. Clement Swisher
*Attorney*—Charles Hieken

ABSTRACT: A wind tunnel uses a working fluid in which the speed of sound is substantially lower than in air so that vehicles may be tested in a relatively low-velocity stream to determine performance when moving relatively much faster in air.

PATENTED DEC 21 1971

3,628,380

INVENTOR
CHARLES L. FELDMAN
BY Wolf, Greenfield, Hieken & Sacks
ATTORNEYS

LOWER VELOCITY WIND TUNNEL

BACKGROUND OF THE INVENTION

The present invention relates in general to wind tunnels and more particularly concerns a novel wind tunnel that tests a high-speed aerodynamic vehicle in a fluid stream moving much slower than the design relative velocity between the aerodynamic vehicle and an air stream.

It is common practice to study the characteristics of an aerodynamic vehicle by making a model of the vehicle and testing the model in a wind tunnel. Since most high-speed aerodynamic vehicles may travel at or near supersonic velocities, realistic testing of high-speed aerodynamic vehicles requires establishing supersonic velocities in the wind tunnel. Typical prior art wind tunnels move a stream of air through the wind tunnel at supersonic velocities. Achieving high velocities in this manner requires high power and presents a number of problems, such as erosion of the wind tunnel by the rapidly moving air stream.

Accordingly, it is an important object of this invention to drastically reduce wind tunnel velocities while providing a high Mach number environment for a vehicle model to be tested.

SUMMARY OF THE INVENTION

According to the invention, a stream of amorphous medium is introduced into the wind tunnel and is characterized by a velocity of sound that is much lower than the velocity of sound in air.

Numerous other features, objects and advantages of the invention will become apparent from the following specification when read in connection with the accompanying drawing in which:

DETAILED DESCRIPTION OF PREFERRED EMBODIMENTS

Figure 1:
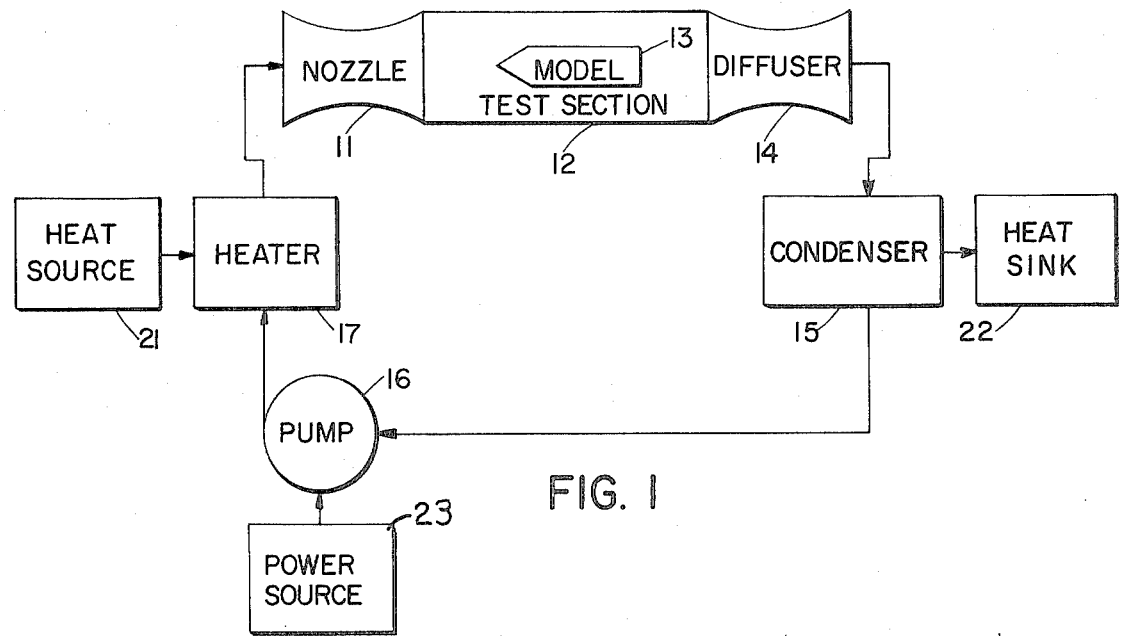
FIG. 1 is a block diagram illustrating the logical arrangement of a wind tunnel according to the invention.

With reference now to the drawing, and more particularly FIG. 1 thereof, there is shown a block diagram illustrating the logical arrangement of a representative system according to the invention. This embodiment of the invention includes a convergent-divergent (i.e. supersonic) nozzle 11, a test section 12 containing the model 13, a supersonic convergent-divergent diffuser 14, a condenser 15, a pump 16 and a heater 17. This system also includes working fluid according to the invention carried in appropriate ducting to connect the various components of the system and contain and guide the working fluid. A heat source 21 delivers heat to heater 17, and a heat sink 22 removes heat from condenser 15. A power source 23 delivers power to operate pump 16.

Figure 2:
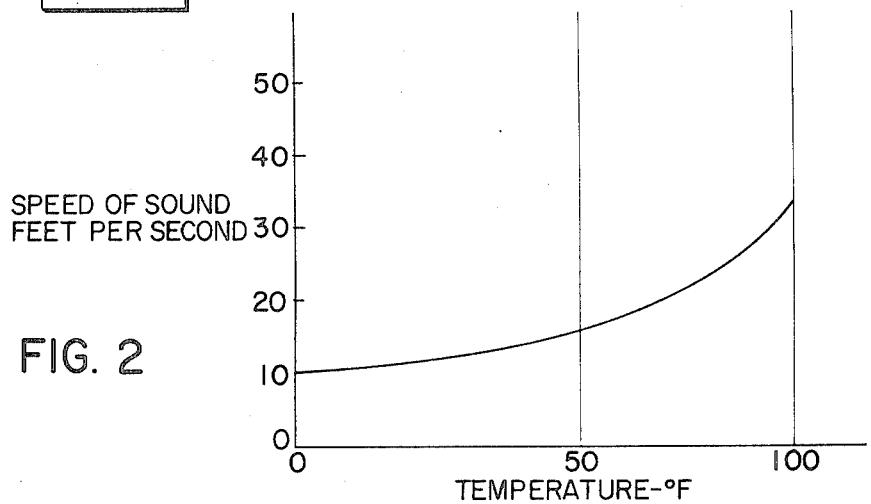
FIG. 2 is a graphical representation of the speed of sound in a particular refrigerant as a function of temperature.

Referring to FIG. 2, there is shown a set of examples in which the speed of sound is a function of pressure for a mixture of refrigerant 12 (dichlorodifluoromethane) and a very small fraction (less than 10 percent by volume) of its own vapor to form a bubbly mixture. Qualitatively, these low speeds of sound occur because the two-phase mixture has approximately the compliance of the gas and nearly the density of the liquid. The exact value for the speed of sound depends on such factors as the pressure, temperature, volume ratio of gas to liquid, the identity of the working substrates and whether the working fluid is a single component; that is, a liquid with its own vapor, or two components. Other mixtures might comprise water and air and water and water vapor.

Figure 3:
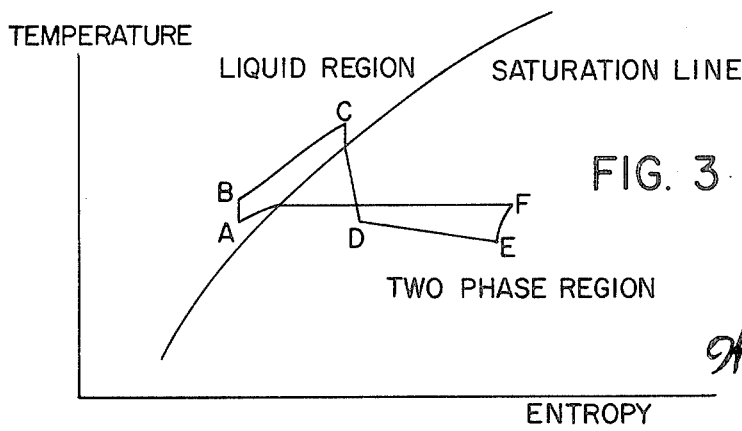
FIG. 3 is the temperature-entropy representation of the state points of a two-phase wind tunnel according to the invention.

Referring to FIG. 3, there is shown a possible set of state points for the embodiment of FIG. 1. Fluid at point A (subcooled liquid) has its pressure increased by pump 16. The fluid leaves pump 16 at state point B and enters the heater 17 where its temperature is increased substantially isobaricly. The fluid leaves heater 17 at state point C and enters the convergent-divergent nozzle 11 where it is accelerated and expanded as its pressure decreases. The fluid leaves the nozzle at state point D and enters the test section 12 in which the pressure may change as a result of friction and shock interaction with the model 13. The fluid then leaves the test section 12 at state point E and enters the convergent-divergent diffuser 14 where it is decelerated and undergoes a pressure rise. Condenser 15 then removes heat from the fluid that is absorbed by heat sink 22 and condenses and slightly subcools the fluid substantially isobaricly so that the fluid leaves the condenser 15 at state point A.

Table I below is an example of a set of possible state points for this embodiment of the invention using refrigerant 12 (dichlorodifluoromethane) as the working fluid. Other embodiments of the invention using other working fluids or combinations of working fluids and other combinations of apparatus to produce a high Mach number at relatively low velocity in the test section are possible and now apparent to those skilled in the art.

TABLE I

| | Temperature, °F. | Pressure, p.s.i.a. | Velocity, ft./sec. | Mass fraction vapor | Speed of sound* | Mach number |
|---|---|---|---|---|---|---|
| State point: | | | | | | |
| A | 90 | 124.7 | Nil | | | |
| B | 90 | 216.9 | Nil | | | |
| C | 100 | 216.9 | Nil | | | |
| D | 96 | 124.7 | 100 | .017 | 44.5 | 2.25 |
| E | 92 | 117.82 | 100 | .0335 | 54.5 | 1.84 |
| F | 96 | 124.7 | Nil | .0205 | | |

*Based on equilibrium calculation

There has been described an especially advantageous system for testing models for aerodynamic performance and high Mach numbers without moving an air stream at supersonic velocities to provide reliable test information with apparatus that is much more practical to use. It is apparent that those skilled in the art may now make numerous modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Aerodynamic body testing apparatus comprising,
   means defining a test chamber for supporting an aerodynamic vehicle to be tested,
   a source of an amorphous medium that is a bubbly mixture in which the velocity of sound is considerably less than that in air,
   and means for relatively moving said amorphous medium and said vehicle in said chamber to produce a predetermined Mach number at relative velocity between said medium and said vehicle considerably less than the relative velocity between said vehicle and air required to produce the same predetermined Mach number.

2. Aerodynamic body testing apparatus in accordance with claim 1 and further comprising,
   means for relatively moving said amorphous medium and said vehicle at a velocity at least equal to the speed of sound in said amorphous medium.

3. Apparatus for testing an aerodynamic body in accordance with claim 2 wherein said amorphous medium is a two-phase fluid.

4. Apparatus for testing an aerodynamic body in accordance with claim 3 wherein said amorphous medium is a single component two-phase fluid.

5. Aerodynamic body testing apparatus in accordance with claim 3 wherein said amorphous medium is two-component two-phase fluid.

6. Aerodynamic body testing apparatus in accordance with claim 1 and further comprising means for recirculating said amorphous medium through said chamber and establishing a closed operating cycle which cycle embraces the saturation line between the liquid region and the two-phase region.

7. Aerodynamic body testing apparatus in accordance with claim 6 and further comprising,
means for recirculating said amorphous medium,
means for heating said amorphous medium preparatory to being introduced into said chamber,
and means for withdrawing heat from said amorphous medium after it exits from said chamber.

8. Aerodynamic body testing apparatus in accordance with claim 7 and further comprising,
convergent-divergent nozzle means for introducing the heated amorphous medium into said chamber to expand said amorphous medium and decrease its pressure,
and convergent-divergent diffusing means through which said amorphous medium passes after leaving said chamber for decelerating said amorphous medium and increasing its pressure.

9. Aerodynamic body testing apparatus in accordance with claim 1 wherein said amorphous medium is less than 50 percent gas by volume.

10. Aerodynamic body testing apparatus in accordance with claim 2 wherein said amorphous medium is less than 50 percent gas by volume.

11. Aerodynamic body testing apparatus in accordance with claim 3 wherein said amorphous medium is less than 50 percent gas by volume.

12. Aerodynamic body testing apparatus in accordance with claim 4 wherein said amorphous medium is less than 50 percent gas by volume.

13. Aerodynamic body testing apparatus in accordance with claim 5 wherein said amorphous medium is less than 50 percent gas by volume.

14. A method of testing an aerodynamic body which method includes the steps of,
placing an aerodynamic body to be tested in a test chamber,
introducing into said test chamber an amorphous medium that is a bubbly mixture in which the velocity of sound is considerably less than that in air,
and relatively moving said amorphous medium and said vehicle in said test chamber to produce a predetermined Mach number at relative velocity between said medium and said vehicle considerably less than the relative velocity between said vehicle and air required to produce the same predetermined Mach number.

15. A method of testing an aerodynamic body in accordance with claim 14 and further comprising,
relatively moving said amorphous medium and said vehicle at a velocity at least equal to the speed of sound in said amorphous medium.

16. A method of testing an aerodynamic body in accordance with claim 15 and further including the steps of,
recirculating said amorphous medium through said test chamber and establishing a closed operating cycle which cycle embraces the saturation line between the liquid region and the two-phase region, 17. A method of testing an aerodynamic body in accordance with claim 16 and further including the steps of,
heating said amorphous medium before introducing it into said test chamber,
and withdrawing heat from said amorphous medium after it exits from said test chamber.

18. A method of testing an aerodynamic body in accordance with claim 17 and further including the steps of,
expanding said amorphous medium and decreasing its pressure while introducing it into said test chamber,
and accelerating said amorphous medium and increasing its pressure after it leaves said test chamber.

19. Aerodynamic body testing apparatus comprising,
means defining a test chamber for supporting an aerodynamic vehicle to be tested,
a source of an amorphous medium that is a bubbly mixture in which the velocity of sound is less than that in air,
and means for relatively moving said amorphous medium and said vehicle in said chamber,
said amorphous medium being a single component two-phase fluid.

* * * * *